W. S. WARD.
RAT TRAP.
APPLICATION FILED MAY 11, 1910.

977,240.

Patented Nov. 29, 1910.

WITNESSES:

INVENTOR
William S. Ward
BY
ATTORNEYS

UNITED STATES PATENT OFFICE.

WILLIAM SILKWORTH WARD, OF KENNEWICK, WASHINGTON.

RAT-TRAP.

977,240.  Specification of Letters Patent.  Patented Nov. 29, 1910.

Application filed May 11, 1910. Serial No. 560,566.

*To all whom it may concern:*

Be it known that I, WILLIAM S. WARD, a citizen of the United States, and a resident of Kennewick, in the county of Benton and State of Washington, have invented a new and Improved Rat-Trap, of which the following is a full, clear, and exact description.

The invention is an improvement in rat traps, more especially such as are designed to be suspended on a horizontal or inclined cable or hawser to intercept the rat as it travels from one point to another, as from a dock to a vessel.

The invention has in view a rat trap embodying a number of trap doors which are kept face up by the eccentric suspension of the trap on the hawser, the trap having a barrier arranged to prevent the animal from crossing on the hawser without passing onto the doors, and provided with skids to slide the animal onto the doors to either side of the hawser.

Reference is to be had to the accompanying drawings forming a part of this specification, in which similar characters of reference indicate corresponding parts in all the views.

Figure 1:
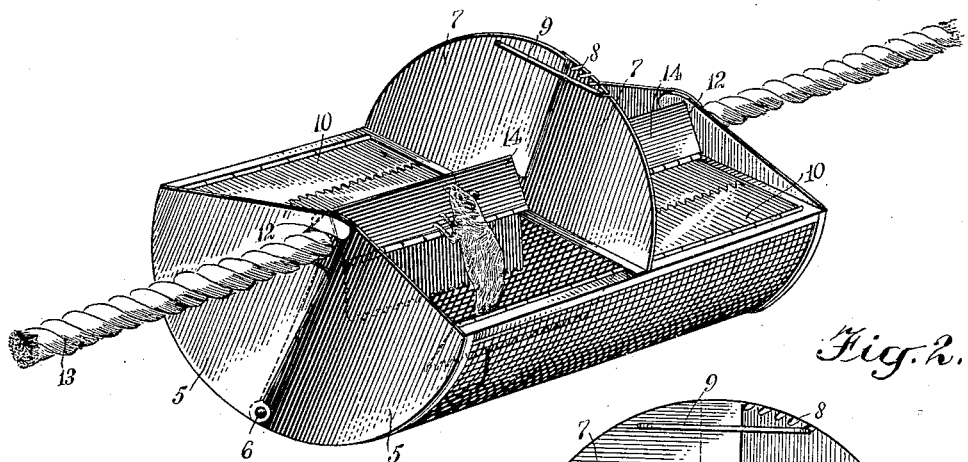
Figure 2:
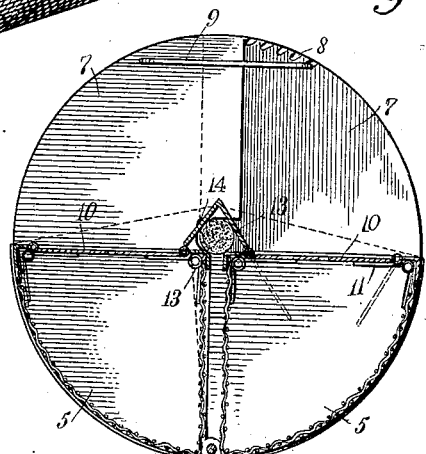

Figure 1 is a perspective view of a rat trap embodying my invention and suspended from a hawser, one of the rats being shown in the act of falling through the trap doors; Fig. 2 is a cross-section of the trap; and Fig. 3 is a similar section, with the two half portions of the trap swung apart, as when releasing the trap from the hawser.

Figure 3:
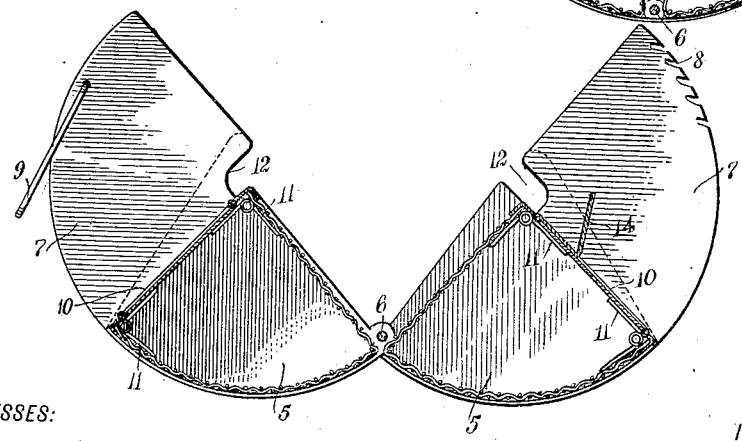

The trap proper or cage of the trap is preferably of semi-cylindrical form, the cage being divided into two half sections 5, 5, which are hinged together at the bottom, as indicated at 6, and each constituting a cage in itself independent of the other, as clearly shown in Figs. 2 and 3. The top or flat face of the trap is provided preferably at an intermediate point, ordinarily at the center of the cage, with a barrier comprising barrier sections 7, suitably secured to the respective sections of the cage, one of the barrier sections shown to have a series of peripheral notches 8, adapted to be engaged by a link or loop 9, loosely connected with the other barrier section, and serving to lock the upper portions of the cage sections together.

The trap is provided with a number of trap doors at the top faces of the cage sections 5, these doors 10 being shown to be arranged over each cage section at each side of the barrier, and are hinged at the side edges in a suitable way to swing inwardly, the doors being normally retained in a closed position by springs 11, which springs while sufficiently strong to instantaneously return the doors when the latter are depressed, yet are easily overcome by the weight of the rat. The end walls of the cage sections are extended slightly above the doors and are provided with notches or hooks 12, to fit over and receive the hawser 13, on which the trap is suspended. The adjustable connection between the barrier sections adapts the trap to be firmly applied or clamped to hawsers of different sizes, so that there is no opportunity for the trap to slide down the hawser when the trap has been once adjusted. The platform construction presented by the doors naturally induces the animal in attempting to pass over on the hawser, to leave the hawser at the end of the trap and walk upon the doors. To, however, make the travel onto the doors imperative, that portion of the hawser between the ends of the trap is covered with skids 14, the skids being of inverted V-form and secured together, as by making both skids of a single piece of metal. The lower edge of one skid is preferably hinged to one of the cage sections so as to swing from over the hawser, as shown in Fig. 3, when in the act of removing and applying the trap. The skids are divided into two sections to clear the barrier, and when in operative position not only serve to slide the animal onto the doors into one or the other section of the cage, but also constitute a guard for that portion of the hawser which it covers. As substantially the entire weight of the trap is arranged below the hawser, the trap will at all times tend to keep the trap doors face up, by gravity.

Having thus described my invention, I claim as new and desire to secure by Letters Patent:

1. A rat trap having doors and provided with means for suspending it from a hawser, the said means arranged to keep the doors face up by the weight of the trap, and a barrier arranged to prevent the rat from passing across the hawser without passing onto the doors.

2. A rat trap having trap doors and provided with means for suspending it from a hawser, and skids arranged over the hawser to slide the rat onto the doors.

3. A rat trap comprising two cage sections, each having trap doors at the top, and hawser engaging means arranged between the sections of the cage in a position to keep the doors face up by the weight of the trap.

4. A rat trap comprising cage sections hinged together at the bottom to swing to and from each other, each cage section having trap doors, hawser engaging devices arranged between the sections of the cage, and barrier sections carried by the cage sections above the doors and having means to adjustably connect them together.

5. A rat trap having an approximately flat upper face, a barrier extending upwardly from the said face of the trap to prevent the rat from traveling directly across said face, and means for suspending the trap from a hawser, arranged to keep the said face up by the weight of the trap.

6. A rat trap comprising two cage sections hinged together at the bottom to swing to and from each other, each section having trap doors at the top, and skids rigidly connected and hinged to one of the cage sections to swing over and rest on the other cage section.

7. A rat trap comprising two cage sections hinged together at the bottom to swing to and from each other, means for suspending the trap from a hawser, arranged between the cage sections, each cage section having trap doors at the top, and skids hinged to one of the sections of the cage and arranged to swing over the hawser.

In testimony whereof I have signed my name to this specification in the presence of two subscribing witnesses.

WILLIAM SILKWORTH WARD.

Witnesses:
F. C. BROWN,
CHAS. MURRAY.